No. 841,760. PATENTED JAN. 22, 1907.
A. A. BALL, Jr.
SYSTEM OF REGULATION FOR GENERATORS AND BURNERS.
APPLICATION FILED SEPT. 9, 1901.
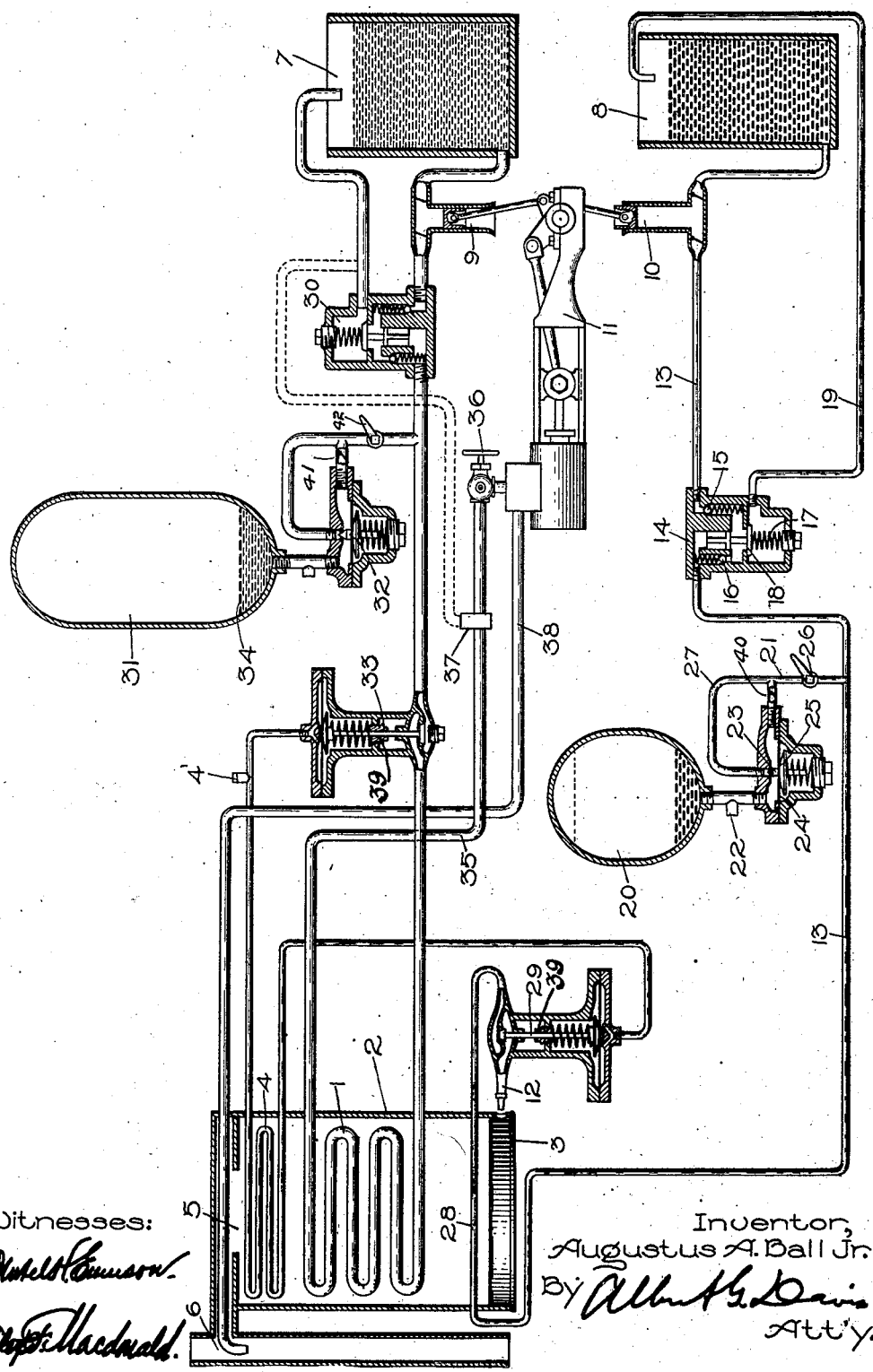
Witnesses:
Inventor,
Augustus A. Ball Jr.
By Albert G. Davis
Att'y.

UNITED STATES PATENT OFFICE.

AUGUSTUS A. BALL, JR., OF LYNN, MASSACHUSETTS, ASSIGNOR TO GENERAL ELECTRIC COMPANY, A CORPORATION OF NEW YORK.

SYSTEM OF REGULATION FOR GENERATORS AND BURNERS.

No. 841,760. Specification of Letters Patent. Patented Jan. 22, 1907.

Application filed September 9, 1901. Serial No. 74,742.

*To all whom it may concern:*

Be it known that I, AUGUSTUS A. BALL, Jr., a citizen of the United States, residing at Lynn, county of Essex, State of Massachusetts, have invented certain new and useful Improvements in Systems of Regulation for Generators and Burners, of which the following is a specification.

In operating generators of the flasher type the amount of water supplied thereto is varied by a suitable regulator in accordance with the demand, and in order to operate the system economically the amount of fuel supplied to the fire-chamber should also be varied. Regulators have been devised which vary proportionately the amounts of water and fuel supplied to the generator and fire-chamber, respectively, and theoretically such a device should give perfect regulation, but in actual practice it does not because of the lag between the supply of fuel to the fire-chamber and the utilization of the heat units contained therein. This lag is due to a number of causes. In the first place, the metal of which the generator is composed takes an appreciable time to absorb heat, and time is also consumed in raising the temperature of the water. Again, the complete combustion of the fuel requires time. The loss due to radiation is comparatively constant. Consequently the amount of fuel consumed does not decrease directly in proportion to the reduction in steam consumption. In other words, the ratio between the steam consumed and the fuel supplied is a variable one. Theoretically speaking, a certain quantity of hydrocarbon fuel—such as kerosene, for example—contains a given number of heat units, and therefore a given consumption should produce a definite amount of steam; but with the commercial article the number of heat units varies, so that it becomes necessary to compensate for it, as well as for the other features above pointed out.

The object of my invention is to overcome the objections above pointed out and at the same time supply the generator and burner with water and fuel in such amounts as will produce steam in an efficient manner.

In carrying out my invention two differentially-acting means are provided, one for the water, the other for the fuel. These means may take the form of valves which are preferably so set that when the steam-generator is cold, or relatively so, the water-controlling valve is closed while the fuel-controlling valve is admitting the maximum amount of fuel to the fire-chamber.

I consider a fuel that may be burned either as a liquid or as a gas to be the best and in describing my invention shall do so in connection with a system of that character; but nothing herein is to be construed as limiting the invention in its broadest aspect to any particular kind of fuel, or to any specific means for supplying it to the fire-chamber, or to any specific type of generator.

Considering the invention more specifically, a thermostat or thermostats are employed to control the action of the valves or other supply-regulating means. The thermostat or thermostats are so located that it or they are acted upon by the fire-gases after the latter have passed the generator and have had a large number of heat units abstracted therefrom. The exact position of the thermostat is immaterial so long as it is acted upon by the fire-gases after they have passed the whole or a part of the generator. It may be located so that practically all of the fire-gases pass through or near it, or it may be so located that only a shunted portion of the fire-gases affect it.

Other novel features of importance in my invention will be fully described and claimed hereinafter.

In the accompanying drawing is illustrated, diagrammatically, an embodiment of my invention suitable for use with any system wherein its is desired to automatically regulate the supply of water and fuel to a generator and fire-chamber, but designed more especially for use in connection with automobile regulation.

In the drawing, 1 represents a generator or flash-boiler of any suitable construction. In the present instance it is shown as consisting of a coil of pipe surrounded by an inclosure 2. Situated below the generator is a burner 3 of any suitable construction. In the present instance it is intended that the burner shall operate satisfactorily when supplied with a hydrocarbon fuel—such as kerosene or kerosene vapor, for example. Situated above the generator and in such position that it is acted upon by all or a portion of the fire-gases is a thermostat 4. This thermostat consists of a sealed chamber containing some sort of a fluid. I have found that kerosene will work satisfactorily for this purpose, since the temperature may be increased to 600° or 700° Fahrenheit without carbonizing or forming permanent gases. The use of kerosene as a fluid in the thermostat also possesses certain other advantages, as it has rather a high boiling-point—about 355° Fahrenheit. Consequently the temperature of the fire-gases has to rise considerably before the kerosene is volatilized. On the other hand, when once volatilized its pressure rises rapidly. The rapid increase in pressure gives the necessary power to operate the valve or valves and overcome the friction of the moving parts. A slight change in temperature gives a considerable variation in pressure. The thermostat may also be worked with nitrogen gas, alcohol, air, a combination of oils, or water. The last-mentioned is somewhat objectionable, however, in that it is liable to freeze if the fire is put out and the thermostat is exposed to the cold weather. The thermostat should be adjusted to work within changes of 40° to 50° in temperature and should be so located as to be unaffected by outside influences. In order to prevent the thermostat from being affected by these influences, I prefer to locate the valves which are under its control near the generator, so that short pipes may be employed, and, preferably, these should be of small diameter. Good results can be attained, however, if the various parts are somewhat remote from each other and the generator. The thermostat will work very satisfactorily if the temperature of the fire-gases be maintained anywhere from 300° to 600° Fahrenheit. In other words, the fire-gases can be maintained at 300°, at 600°, or at any intermediate point. The invention, however, is not limited to any particular range of temperatures. I have merely stated what I have found to be satisfactory for certain kinds of work. The metal of which the thermostat is composed being relatively thin, the temperature of the medium within it will be substantially the same as that of the fire-gases and is of course dependent upon the location of the thermostat with respect to the fire-gases and the body or bodies heated thereby.

In order to supply the necessary medium to the thermostat, a valved opening 4' is provided, through which it may be admitted, after which the opening is sealed in any suitable manner. The thermostat should be so located that it will be acted upon by the fire-gases after a large number of the heat units have been abstracted by the generator or boiler. The arrangement illustrated will be found to be a satisfactory one; but for certain classes of work it may be found desirable to so position the thermostat that it is acted upon by only a limited amount of the fire-gases. In the latter instance the parts would be so arranged that the fire-gases are shunted or otherwise conveyed around the thermostat. The upper end of the steam-generator casing is provided with a chamber 5, into which fire-gases pass, and this chamber communicates with the flue 6, the latter being opened top and bottom.

Water is supplied to the generator from the tank 7 and fuel to the burner from the tank 8, pumps 9 and 10 being employed to furnish the necessary pressure. These pumps in the present instance are driven direct by the engine 11, or they may be driven through gearing or belted connections, so that changes in speed of the engine will correspondingly affect both of the pumps. The pumps may be driven from a separate source of power or they may have individual driving means. The engine may be of any suitable character and arranged to drive a vehicle or furnish power, as desired. The fuel-pump 10 is connected to the fuel-tank by a suitable pipe and is provided with the usual suction and delivery valves. Extending from the pump to the fuel-admitting nozzle 12 is a pipe 13, and the pressure therein may, for example, be varied from twenty to eighty pounds, depending upon the system. In circuit with the pipe 13 is a by-pass regulator 14, of novel construction, which forms the subject-matter of a patent to me dated May 5, 1903, and numbered 726,841. The delivery of fuel is normally controlled by the spring-pressed valves 15 and 16; but when for any reason the back pressure on the burner increases to a point where it overcomes the adjustable spring 17 the valve 18 will open and permit the fuel from the pipe 13 to flow through the valve 18 into the pipe 19, thence back to the tank. The valve 18 being balanced is not affected by the normal flow of liquid through the pipe 13; but as soon as the back pressure from the burner increases to a point where it overcomes the spring it opens and relieves the load on the pump, for, practically speaking, no effort is required to convey fuel through the pipe 13 and back through the pipe 19, the parts being comparatively small and being located in close proximity to the tank.

In order to insure the proper supply of fuel to the burner under varying conditions, an accumulator 20 is employed, and this is connected in circuit with the pump and regulator by the pipe 21. This accumulator preferably contains air or other elastic medium under pressure, and in order to furnish the initial pressure a valved opening 22 is provided, to which an ordinary air-pump may be secured. As shown, the accumulator is supposed to be under about twenty pounds air-pressure, and the fuel occupies only a very small space therein. The dotted line at the top represents the condition when the pressure has been increased to about eighty pounds per square inch. The delivery of fuel from the accumulator to the pipe 13 is controlled by a valve 23, the latter being actuated by a diaphragm 24. Situated below the diaphragm is an adjustable spring-pressed plunger 25, that tends at all times to hold the valve in the closed position. The admission of fuel to the accumulator is also controlled by the manually-actuated valve 26. Leading from the pipe 21 to the accumulator side of the diaphragm is a short pipe containing an inwardly-opening check-valve 40. So long as the pressure in the accumulator is below a predetermined point the valve 23 will remain closed; but as soon as it exceeds that point the diaphragm is depressed, which opens the valve, and fuel flows through the pipes 27 and 21 to the pipe 13 and through the nozzle 12 to the burner. The valve is closed at initial pressure and opens under accumulator pressure. If it is desired to absolutely cut the accumulator out of action—such, for example, as shutting down the system for a considerable period of time—the manually-actuated valve 26 may be closed. This will retain the fuel in the accumulator under pressure, which may be utilized in starting the system again into operation.

Situated above the burner is a vaporizer 28 of any suitable construction. This vaporizer is connected to the nozzle 12, and the latter admits vapor to the burner. The admission of fuel to the nozzle is controlled by a valve 29, which is acted upon by two forces, one being due to the spring located above the diaphragm and the other due to the pressure within the thermostat 4, and is so set that it is wide open when the thermostat and other parts are cold, or relatively so. With this condition of affairs the total delivery of fuel to the burner is limited only by the valve controlling the nozzle and the size of the pipes employed. In practice I prefer to make the orifice in the nozzle limit the maximum output.

The supply of water to the generator is controlled by the pump 9, a regulator 30, an accumulator 31, a diaphram-actuated valve 32 for controlling the accumulator, and a valve 33, the latter being acted upon by the thermostat 4 in one direction and a spring in the other. The by-pass regulator 30 is the same as the regulator 14 and operates in the same manner. The construction of the accumulator 31 and its controlling-valves differs from the fuel-accumulator 20 only in size. This difference in size is necessary to supply the amount of water to the generator. The inwardly-opening check-valve is numbered 41 and the manually-actuated valve 42. In order to prevent the air or other elastic medium from escaping from the accumulator, by being entrained in the water, and also to prevent the interior of the chamber from rusting, a film of oil 34 is provided, which floats on top of the water, prevents the air from mixing with the water, and deposits more or less oil on the walls of the chamber and prevents rusting.

In the present instance I have shown a thermostat 4 acting on the fuel and water supply valves, which valves are set to operate at different pressures and are differentially adjusted with respect to each other. When the parts are cold, the fuel-valve 29 is wide open, while the water-controlling valve 33 is closed. Instead of using a single thermostat controlling the operation of two separately-adjustable valves I may employ separate thermostats, or I may employ a single thermostat similar to the one shown, with means for separating that portion of the fluid which actuates one valve from the fluid which actuates the other valve. The structure illustrated is somwhat simpler than the one just described, and for that reason I prefer to use it.

The spring for actuating each valve is under compression by an adjustable nut 39, sleeved on the valve-stem. Said spring constitutes a motive-power agency, and the action of these agencies is opposed or controlled by the thermostat 4 and the diaphragms.

Steam from the generator is conveyed to the engine by the pipe 35, and the engine is controlled by the throttle-valve 36. Located in the pipe 35 is a safety-valve 37. Under ordinary conditions, with the fuel and water controlling valves under the complete control of the thermostat, there would be no need for such a valve; but in event of the thermostat becoming disabled from any cause and the pressure in the generator increasing to an excessively high point the valve will open and relieve the system of any dangerous pressure. I may connect this valve with the water-tank 7, as indicated in dotted lines, so that any discharged water will be saved and the steam utilized to assist in heating the feed-water. The exhaust from the engine is conveyed by the pipe 38 through the chamber 5 in the top of the generator-casing and into the upwardly and downwardly opening flue 6. This arrangement increases the draft of the burner when the system is in operation.

The action of my invention is as follows: Assuming that the parts are cold and it is desired to start the system into operation, a suitable auxiliary heating device is first employed to heat the vaporizer 28. When this has been done, the valve 26 is opened, permitting the fuel to flow from the accumulator 20 or other source of supply through the pipe 13 and vaporizer 28 to the nozzle 12, where it will flow into the burner 3 and be ignited. The valve 29, being normally open when the parts are cold, or relatively so, admits the maximium amount of fuel. In the meantime the valve 33, controlling the admission of water to the boiler, remains closed, although there will be a certain amount of water in the tubes, a part of which is due to the condensation of the steam left from the last run. The fuel-valve continues to admit the maximum amount of fuel to the burner until the temperature of the generator is materially increased. As the temperature increases less heat units will be absorbed, and consequently the temperature of the thermostat will begin to increase rapidly, and as soon as it increases to a predetermined point the valve 33 opens and admits water to the generator from the accumulator 31 or other source of supply until the proper ratio of the supplies is reached. As soon as steam is admitted to the engine the pumps 9 and 10 begin to operate and force water to the generator and its accumulator and fuel to the burner and its accumulator, thus maintaining the supply. As the speed of the engine increases the pressure on the accumulators will be raised to a maximum and the surplus will return to the tanks by means of the by-pass regulators. As soon as the back pressure on regulators 14 and 30 reaches the maximum for which the regulators are set the load on the pumps is practically cut off, thus effecting a saving in power. Assuming the valves to be in intermediate positions and that for some reason the steam-generator becomes relatively cold, the supply of water through the valve 33 will be cut off or decreased, while, on the other hand, the supply of fuel to the burner will be increased by reason of the opening of valve 29, and this relation of affairs will exist until the proper temperature of the parts has again been attained. If the generator increases in temperature beyond a certain point, the supply of fuel is automatically cut down, while the supply of water is increased.

It will be seen that whereas other systems of control for the purpose of compensation simultaneously and automatically increase or decrease the supply of water and fuel in proportionate amounts with my system the supply of water is increased while the supply of fuel is decreased, and vice versa. With my improved system any change in temperature is detected and compensated for more rapidly than in any other with which I am familiar.

It will be seen that the invention includes primary and secondary regulation. In the present illustration of the invention the thermostat forms the primary regulator and the valves the secondary. When viewed in a more limited aspect, the invention includes a primary, a secondary, and a tertiary regulator, the primary regulator being the thermostat, the secondary the throttle-valves directly controlled thereby, and the tertiary the relief or by-pass valves which reduce the effective deliveries of the pumps.

Between the secondary and tertiary regulators in both the fuel and liquid supply systems is placed an accumulator which when the secondary regulator closes or partially closes receives a greater or less amount of fluid and by so doing prevents the tertiary regulator from operating under minor changes. In other words, a curve representing the operation of the system fitted with accumulators would be smoother than one without. The accumulator is very desirable, but may be dispensed with under certain conditions, and when the system is operated without it the tertiary regulator may act at about the same time as the secondary regulator, depending upon the conditions of service. The character of the route traveled over and the load on the vehicle are important considerations in determining the action of the several regulators. The invention is intended for use more especially with automobiles, where the conditions are constantly changing. Hence the relation between one regulator and another may change somewhat, as will be readily understood.

In using the term "differential variations in the liquid and fuel supplies" I mean that under certain conditions of operation the regulator will momentarily increase the effective fuel-supply and decrease the effective supply of liquid to the vaporizer, and vice versa, in order to quickly compensate for said changes. In other words, instead of always maintaining a fixed ratio between the fuel and liquid supples there are times when the ratio of one to the other is greater or less, depending upon the condition of operation.

In accordance with the provisions of the patent statutes I have described the principle of operation of my invention, together with the apparatus which I now consider to represent the best embodiment thereof; but I desire to have it understood that the apparatus shown is merely illustrative and that the invention can be carried out by other means.

What I claim as new, and desire to secure by Letters Patent of the United States, is—

1. In combination, a generator, a fire-chamber, a source of water-supply, a regulating-valve therefor, means tending at all times to close the valve, a source of fuel-supply, a regulating-valve therefor, means tending at all times to open the valve, and means for controlling the action of the valves.

2. In combination, a valve, a spring tending at all times to open the valve, a second valve, a spring tending at all times to close the second valve, and a means common to both valves for opposing their actions.

3. In combination, a motive-power agency that has a tendency at all times to move in a given direction, a second motive-power agency that also has a tendency to move in a given direction, a sealed fluid-containing chamber provided with a diaphragm adjacent to and acting on each motive-power agency, and a thermostat for controlling the movements of said diaphragm.

4. In a system of regulation, the combination of a generator, a fire-chamber, sources of water and fuel supply, a thermostat located in the fire-gases beyond the generator, a pair of differentially-acting valves controlling the water and fuel supplies, and diaphragms acted upon by the thermostat for differentially moving the valves.

5. In a system of regulation the combination of a generator, a burner, a water-supply, a fuel-supply, pumps for increasing the pressure of the water and fuel supplies, a by-pass regulator for each pump, an accumulator for the water-supply, an accumulator for the fuel-supply, and means for controlling the action of the by-pass regulators and the accumulators.

6. In combination, a generator, a burner, a thermostat comprising a closed vessel containing an elastic medium, and located in such manner that it is acted upon by the heat from the generator and by the fire-gases after they have passed the generator, and a pair of differentially-acting valves for regulating the supply of water to the generator and fuel to the burner, the said valves being under the control of the thermostat.

7. In combination, a thermostat arranged to operate with an elastic medium under pressure, motors controlled by the thermostat, and a pair of differentially-acting valves, each valve being operatively connected to a motor.

8. In a system of regulation, the combination of a generator, a fire-chamber, a source of liquid-fuel supply, a valve for admitting water to the generator which is initially closed, a valve for admitting fuel to the chamber which is initially open, a thermostat operating simultaneously on both valves, and a second valve acting on the fuel-supply to cut it off when the system is idle.

9. In a system of regulation, the combination of a generator, a burner, a valve for admitting water to the generator, which is initially closed, a valve for admitting fuel to the burner which is initially open, means for adjusting the valves so that different pressures are required to operate them, and a means for simultaneously acting on the valves in a manner to open one and close the other.

10. In combination, a generator, a burner, a water-pump, a fuel-pump, a by-pass regulator for the water-pump, a by-pass regulator for the fuel-pump, and a single thermostatic means which controls the action of both regulators and through them the delivery of the pumps.

11. In combination, a generator, a burner, a source of water-supply, a source of fuel-supply, a normally closed valve controlling the water-supply, a normally open valve controlling the fuel-supply, springs for the valves, and a thermostat adapted to exert a pressure to overcome the tension of the valve-springs only after it has been raised to the predetermined temperature by the fire-gases.

12. In a system of regulation, the combination of water and fuel supplies, individually-adjustable valves for regulating the supplies, and a means common to the valves for actuating them.

13. In combination, a boiler, a burner, pumps for supplying liquid to the boiler and fuel to the burner, means for imparting simultaneous movements to the pumps, by-pass valves for the pumps, and a thermostatic means coöperating with the by-pass valves for varying the deliveries of the pumps.

14. In combination, a boiler, a burner, pumps for supplying liquid to the boiler and fuel to the burner, means for imparting simultaneous movements to the pumps, by-pass valves for the pumps, and a pressure device acting on the valves for causing corresponding differential variations in the liquid and fuel supplies.

15. In a vapor-generating system, the combination of a receptacle, a means for supplying liquid to the receptacle, a primary regulator responding to temperature changes, a secondary regulator acted upon by the primary, and a tertiary regulator which varies the effective delivery of said means.

16. In a system of supply, the combination of a receptacle, a means for supplying liquid to the receptacle, a primary regulator, a secondary regulator under the control of the primary, which throttles the fluid-supply to a greater or less extent, an accumulator, and a tertiary regulator which may act at about the same time as the secondary regulator to vary the effective fluid-supply delivered to the receptacle.

17. In a vapor-generating system, the combination of a generator, a fire-chamber, a means for supplying liquid to the generator and fuel to the fire-chamber, a primary regulator, secondary regulators controlled by the primary regulator, and tertiary regulators which coact with the secondary regulators to vary the supplies from said means in response to changes of the primary regulator.

18. In a system of supply, the combination of a fluid-receiving receptacle, a regulator for controlling the admission of fluid to the receptacle, an accumulator containing an elastic medium which compensates for small changes of the regulator, and another regulator which may act when the pressure in the accumulator exceeds a certain amount to compensate for greater changes of the regulator.

19. In combination, a boiler, means containing a supply of fluid for the boiler under an initial pressure, means for storing an additional pressure in said means, as the fluid-pressure in the boiler increases, and controllable means for controlling the delivery of fluid to the boiler.

20. In combination, a boiler, a receptacle containing a supply of fluid under an initial pressure for the boiler, a valve for storing additional fluid under an increased pressure in the receptacle as the pressure in the boiler increases, and a second valve for regulating the delivery of fluid from the receptacle to the boiler.

21. The combination with the steam-generator having pipes in which steam is generated, of a water-supply pipe having a pressure-cylinder in communication therewith and with the steam-pipes, a check-valve, and a valve adapted to be operated by an attendant interposed between said cylinder and steam-pipe, and a relief-valve in communication with said pressure-cylinder, substantially as set forth.

22. The combination with the steam-generator having pipes in which steam is generated, of a water-supply pipe having a pressure-cylinder in communication therewith and with the steam-pipes, a check-valve interposed between said cylinder and steam-pipe, and a relief-valve in communication with said pressure-cylinder, substantially as set forth.

23. The combination of a generator, a fire-chamber, means for supplying liquid to the generator including a pressure-controlled regulator, means for supplying fuel to the fire-chamber including a regulating device, and means for exerting a differential control over the water-regulator and the fuel-regulating device.

24. The combination of a generator, a fire-chamber, means for supplying water to the generator comprising a pump and a pressure-controlled regulator, means for supplying fuel to the generator including a fuel-regulating device, and a means responsive to changes of temperature in a portion of the system which exerts a differential control over the water-regulator and the fuel-regulating device.

25. The combination of a generator, means for supplying water to the generator including a by-pass regulator, means for supplying fuel to the generator including a regulating device, and means responsive to changes of temperature in a portion of the system which exerts a differential control over the by-pass regulator and the fuel-regulating device.

26. The combination of a flash-boiler, means for supplying water to the boiler including a regulating device, means tending to decrease the flow through the water-regulating device, a fire-chamber, means for supplying fuel to the chamber including a regulating device, means tending to increase the flow through the fuel-regulating device, and means for controlling the action of said regulating devices.

In witness whereof I have hereunto set my hand this 3d day of September, 1901.

AUGUSTUS A. BALL, Jr.

Witnesses:
DUGALD McK. McKILLOP,
HENRY O. WESTENDARP.